United States Patent [19]

Hensel et al.

[11] 4,081,576

[45] Mar. 28, 1978

[54] PROCESS FOR PRODUCING AN ADHERENT METAL OXIDE COATING ON A SOLID BODY

[75] Inventors: Jörg Hensel, Hanau; Edgar Koberstein, Alzenau; Eduard Lakatos, Rheinfelden, all of Germany

[73] Assignee: Deutsche Gold- und Silber-Scheideanstalt vormals Roessler, Frankfurt, Germany

[21] Appl. No.: 703,165

[22] Filed: Jul. 7, 1976

[30] Foreign Application Priority Data

Jul. 16, 1975 Germany .............................. 2531769

[51] Int. Cl.$^2$ .......................... B05D 3/02; B05D 1/18
[52] U.S. Cl. .......................... 427/385 C; 427/230; 427/372 R; 427/430 B
[58] Field of Search .................... 427/230, 235, 430 B, 427/243, 372 R, 385 C; 252/430, 463, 461; 428/131

[56] References Cited

U.S. PATENT DOCUMENTS

| | | | |
|---|---|---|---|
| 3,671,302 | 6/1972 | Nell et al. | 427/243 X |
| 3,697,322 | 10/1972 | Lee et al. | 427/372 X |
| 3,767,453 | 10/1973 | Hoekstra | 427/243 |
| 3,870,545 | 3/1975 | Tabacek et al. | 427/372 R X |
| 3,873,350 | 3/1975 | Dwyer et al. | 427/430 X |
| 3,930,085 | 12/1975 | Pasiuk | 427/430 B X |
| 3,944,683 | 3/1976 | Church et al. | 427/430 X |

*Primary Examiner*—Ronald H. Smith
*Assistant Examiner*—Shrive P. Beck
*Attorney, Agent, or Firm*—Beveridge, DeGrandi, Kline & Lunsford

[57] ABSTRACT

An improvement in producing an adherent metal oxide coating on a solid body comprises incorporating a nitrogen-containing polymer in a dispersion of the metal oxide into which the body is dipped. The pH of the dispersion is controlled in order to stabilize the dispersion. The body can then be dried. The invention is especially useful for applying a metal oxide coating to a ceramic material employed as a catalyst carrier for automotive exhaust gas purification.

8 Claims, No Drawings

PROCESS FOR PRODUCING AN ADHERENT METAL OXIDE COATING ON A SOLID BODY

BACKGROUND OF THE INVENTION

This invention relates to a process for the production of an adherent metal oxide coating on a solid body comprised of a chemically inert, porous material, such as a ceramic monolithic catalyst carrier, whereby metal oxide in a pulverized form is dispersed in a liquid medium, the body is dipped into this dispersion and dried.

It is known to produce dispersions from particles having very small grain diameters ($<< 0.1$ $\mu$m). If, however, one wants to disperse particles with a larger grain diameter ($> 1$ $\mu$m) in a liquid medium in order, for example, to apply a metal oxide powder in a thin layer on a ceramic monolith to be used for the purification of exhaust gases from an internal combustion engine, then considerable difficulties arise because of decreased stability of the dispersion. That is, the metal oxide powder settles after a short time. As a result, the dispersion no longer has the initial characteristics necessary for an adequate distribution of the metal oxide on the body; for example, there is not a uniform and sufficient degree of dispersion of metal oxide particles in the liquid medium. Continuous processes, such as those employed in the industrial production of catalysts, cannot be carried out with such unstable dispersions. While the dispersion can be kept in continuous motion in order to avoid these disadvantages, this requires an increased expenditure in apparatus.

Furthermore, many dispersions of solid substances in a liquid medium show only a limited stability range when interfering ions are present. If this range is too narrow, then a destabilization of the dispersion can occur very quickly when impurities are present.

A further disadvantage of the known dispersions is the low adhesive strength of the metal oxide powder applied to a body.

Accordingly, there exists a need in the art for a dispersion which can be processed easily, which has a high stability in the presence of interfering ions, and which imparts excellent adhesive strength to the metal oxide layer formed on a solid body.

SUMMARY OF THE INVENTION

This invention aids in fulfilling this need in the art by providing an improved process for the production of an adherent metal oxide coating on a solid, chemically inert, porous body by dispersing pulverized metal oxide in a liquid medium, dipping the body into the resulting dispersion, and drying the body, wherein the improvement comprises incorporating a nitrogen-containing polymer in the dispersion and controlling the pH value of the dispersion in order to stabilize the dispersion, i.e., in order to prevent the metal oxide from settling and to maintain a substantially homogeneous dispersion.

DETAILED DESCRIPTION

As a chemically inert, porous material, one can employ, for example, a monolithic catalyst carrier comprised of a ceramic, such as, cordierite, mullite or $\alpha$—$Al_2O_3$. Furthermore, porous bulk material carriers of the same materials can be employed.

The concentration of solid substance in the dispersion can vary over a wide range. In most cases, however, a high concentration of solid substance is advantageous. Dispersions of $\gamma$—$Al_2O_3$ in a liquid medium can have a solids content of about 40 to about 55% by weight. Dispersions of $\gamma$—$Al_2O_3$ in a liquid medium with a content of solid substance below about 40% by weight can be more favorable for further processing.

Water is preferably employed as a liquid medium. Organic liquids, such as methanol or/and ethanol, can also be employed for the production of a metal oxide dispersion.

The polymer substance containing nitrogen can be employed in the liquid medium in a quantity of about 0.001 to about 5% by weight, preferably about 0.01 to about 2% by weight, especially about 0.1 to about 1% by weight, related to the weight of the liquid medium. As a polymer substance there is a material employed containing 1-50% nitrogen and which has a molecular weight of 500 to 50,000. One can employ organic compounds which, in the case of further processing of the coated carrier, leave no residues behind. Particularly suitable are organic polymer compounds, such as polyethylene imine or ammonium salts of polymeric carboxylic acid.

Examples for these substances are Polymin P (BASF) and Dolapix CA (Zschirmer and Schwarz), respectively.

In order to maintain the stability of the dispersion, the liquid medium is neutralized by the addition of an aqueous solution of ammonia or by employing a carboxylic acid, such as acetic acid, propionic acid or formic acid.

As a metal oxide one can employ singly or in admixture, for example, $Al_2O_3$, such as $\gamma$—$Al_2O_3$; $TiO_2$; and others which can be dispersed in the liquid medium with an ultra-turrax, Dispax Reactor (Firm Jahnke and Kunkel) or with a ball mill or with a stirring ball mill mechanism.

In many cases, no cooling of the reaction vessel is necessary. If, however, the quantity of heat added during the mixing process is so great that temperatures are reached which lie near the boiling point of the liquid used, then care must be taken to remove the heat by cooling in order to avoid a change in the concentration of the dispersion.

The dispersing time depends upon the size of the batch and on the type and performance of the stirring elements employed, and can amount from a few minutes up to a few hours.

If the dispersion is to be available immediately for further processing, then the dispersion is advantageously cooled to ambient temperature.

Whenever the dispersion is employed for coating catalyst bodies, then the body is dipped into said dispersion so that all parts of the body are wetted evenly. After that, the excess dispersion is removed by shaking out or blowing out. The remaining liquid part of the dispersion is removed from the saturated body by drying at temperatures above the boiling point of the liquid medium. The process of this invention has the advantage that no additional inorganic components, which could negatively influence the catalyst, need to be added to the dispersion. Thus, the overall composition of the catalyst recipe is not changed.

A further significant advantage is the considerably improved adhesive strength of the metal oxide coating to the porous body.

The process of this invention will now be described in greater detail in the following Examples in which all parts, proportions, percentages and ratios are by weight unless otherwise indicated.

EXAMPLE 1 (According to the invention).

In a 2l beaker, 10 g of a 50% aqueous solution of Polymin P (BASF AG) are dissolved in 700 g of desalinated water and are neutralized with acetic acid to a pH value of 7. 300 g of a pulverized, highly pure γ-aluminum oxide are added to this solution. The aluminum oxide has the following grain distribution:
Portion with grain diameter
> 100 μm = 10%
> 50 μm = 35%
> 10 μm = 80%.

After 16 minutes of dispersing with a laboratory ultra-turrax (Jahnke + Kunkel), a dispersion is obtained which has an out-flow time from a 3 mm outflow beaker of 23.7 seconds, and which shows no settling of the solid substance after four weeks.

EXAMPLE 2 (Prior Art)

In a 2l beaker, 300 g of the aluminum oxide used in Example 1 are stirred into 700 g of desalinated water and are dispersed for 1 hour with an ultra-turrax (Jahnke + Kunkel). A stable dispersion is not obtained; the solid substance settles immediately.

EXAMPLE 3 (According to the Invention)

A monolithic cordierite catalyst carrier, EX 20, of the firm Corning Glass is dipped into the dispersion produced according to Example 1. The excess dispersion is removed, and the catalyst carrier is dried at 250° C.

This carrier is tested for 1 hour in water in an ultrasonic tank of the firm KLN-Ultraschall GmbH, Heppenheim, (4l, 150 Watt, 22 kHz). After that, the treated parts are rinsed with water and dried at 250° C. 0.2 g of the 100 g $Al_2O_3$ applied to the carrier had been removed.

EXAMPLE 4 (Prior Art)

The γ—$Al_2O_3$ suspension described in Example 2 is kept in constant motion with a magnetic stirrer. A monolithic catalyst carrier, as stated in Example 3, is dipped into this dispersion and γ-$Al_2O_3$ is applied in a thin layer as in Example 3.

Of 70 g of material applied, 50 g are removed within 1 hour in the ultrasonic tank employed as in Example 3.

EXAMPLE 5

In a manner similar to that described in Example 1, a dispersion is produced which contains 25% $TiO_2$ in water and an addition of 0.5% of polyethylene imine. After a dispersing time of 30 minutes, the dispersion shows an out-flow time of 24 seconds with a 3 mm outflow beaker. A change of the viscosity could not be observed, even after 3 days.

A body of the type AlSiMag 795 of American Lava saturated with this dispersion absorbed 100 g of $TiO_2$ after several dippings. Of this, only 0.5 g of $TiO_2$ was removed in a test following the procedure outlined in Example 3.

What is claimed is:

1. In an improved process for producing an adherent coating of a metal oxide selected from the group consisting of $Al_2O_3$ or $TiO_2$ on a solid, chemically inert, porous, ceramic carrier for a catalyst by dispersing in water said metal oxide in pulverized form, dipping said carrier into the resulting dispersion, and drying said carrier, wherein the improvement comprises incorporating in said dispersion about 0.001 to about 5% by weight of a nitrogen-containing polymer selected from the group consisting of a polyethylene imine or an ammonium salt of a carboxylic acid polymer, and maintaining a pH of about 7 in said dispersion, wherein said metal oxide is comprised of particles having a grain diameter greater than 1 μm.

2. Process according to claim 1, wherein said metal oxide is γ-alumina in an amount up to about 50 weight percent, related to the weight of said dispersion.

3. Process according to claim 2 wherein said carrier is comprised of cordierite, mullite or γ—$Al_2O_3$.

4. Process according to claim 1, wherein said dispersion contains methanol, ethanol, or mixtures thereof.

5. Process according to claim 3 wherein said pH is maintained by additions of ammonia or a $C_1$-$C_3$ carboxylic acid.

6. Process according to claim 5, wherein excess dispersion on said carrier is removed prior to drying.

7. Process according to claim 1 wherein said nitrogen containing polymer is in an amount of about 0.01 to about 2% by weight, related to the weight of said dispersion.

8. Process according to claim 1 wherein said nitrogen containing polymer is in an amount of about 0.1 to about 1% by weight, related to the weight of said dispersion.

* * * * *